J. W. LATCHER.
Curry Comb.

No. 80,190.

Patented July 21, 1868.

Witnesses.
× Geo. Charlesworth,
× Eugene Moreton

Inventor
J. W. Latcher

United States Patent Office.

JOHN W. LATCHER, OF ALBANY, NEW YORK.

Letters Patent No. 80,190, dated July 21, 1868; antedated July 18, 1868.

IMPROVED CURRY-COMB.

*The Schedule referred to in these Letters Patent and making part of the same.*

TO ALL WHOM IT MAY CONCERN:

Be it known that I, JOHN W. LATCHER, of the city and county of Albany, and State of New York, have invented a new and useful Improvement in the Construction of Curry-Combs; and I do hereby declare that the following is a full, clear, and exact description of the construction and nature of the same, reference being had to the annexed drawings, making a part of this specification, in which—

The object of this invention is to make a cheap, light, simple, and durable curry-comb, and one that will not injure the skin of an animal's back, and also to prevent the teeth from becoming choked up, by having them arranged a considerable distance apart, and also to form the same from one block, which constitutes the back or blank from which said teeth are formed or sawed.

Figure 1:
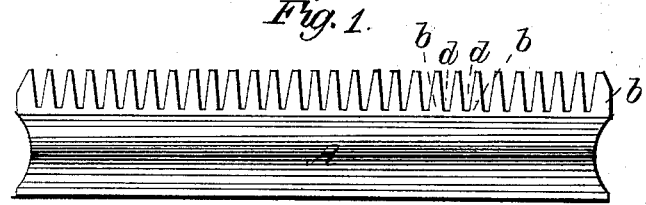
Figure 1 is a front.
Figure 2:
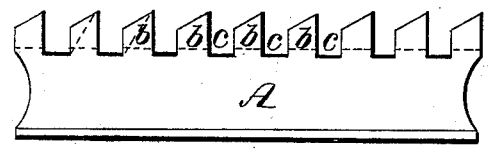
Figure 2 is a side elevation of my invention.

A, figs. 1 and 2, represents the back or blank, the grain or fibre of the wood running, as is shown by the yellow strokes, crosswise of the block, and longitudinal to the teeth $b$. The form or shape of the teeth may be varied from those shown in the drawing, as will be readily understood. The channels $c$, between the rows of teeth, as also the kerfs $d$, between the teeth themselves, may be cut by saws or revolving cutters, or in any other convenient way.

It will be seen that the channels between the rows of teeth, and the spaces or kerfs between the teeth cut upon one block, form a series of rows of teeth on one block, corresponding to the said channels or kerfs cut.

Having thus described my invention, what I claim as new, and desire to secure by Letters Patent, is—

Forming a series of rows of teeth, $b$, from one block, substantially as shown and described, and for the purpose specified.

J. W. LATCHER.

Witnesses:
CHARLES MILLER, Jr.,
BRADLEY S. DUSENBURY.